C. TALBOTCLARKE.
CIGAR-MACHINE.
No. 170,030.            Patented Nov. 16, 1875.
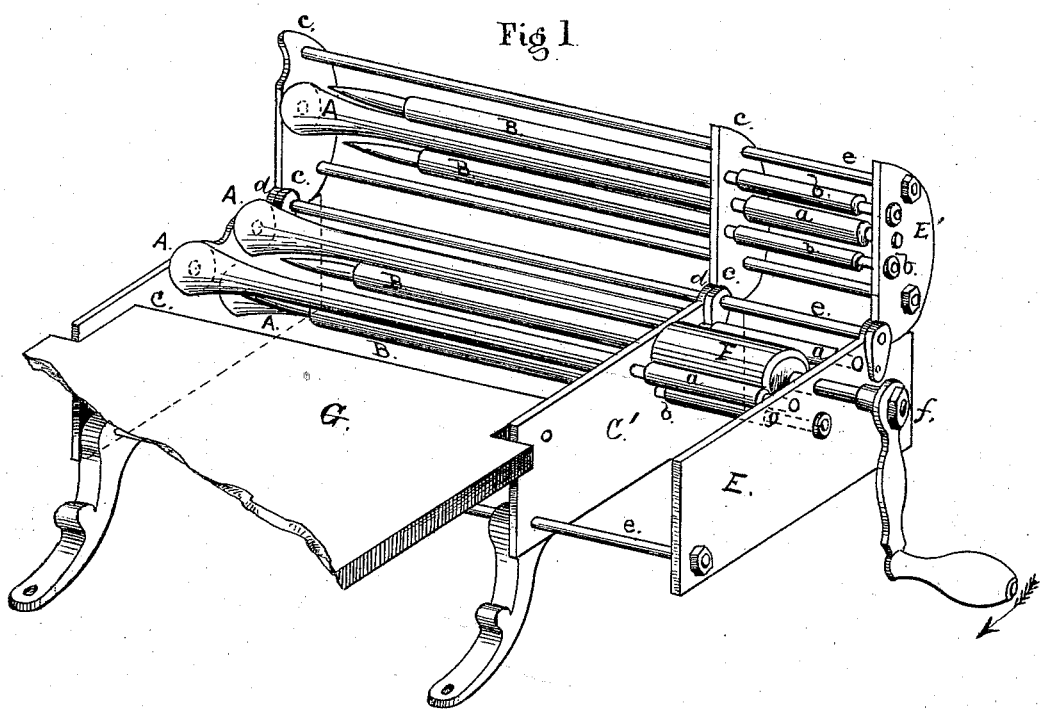
WITNESSES
Edward E. Osborn
Wm. D. English
INVENTOR
Charles Talbotclarke
By C. W. M. Smith
Attorney

UNITED STATES PATENT OFFICE.

CHARLES TALBOTCLARKE, OF SAN FRANCISCO, CALIFORNIA, ASSIGNOR OF TWO-THIRDS HIS RIGHT TO WILLIAM W. LEIGH AND AMOS S. WARNER, OF SAME PLACE.

IMPROVEMENT IN CIGAR-MACHINES.

Specification forming part of Letters Patent No. 170,030, dated November 16, 1875; application filed May 17, 1875.

*To all whom it may concern:*

Be it known that I, CHARLES TALBOT-CLARKE, of San Francisco, State of California, have invented a certain Improvement in Machines for Manufacturing Cigars, of which the following is a specification:

My invention relates to machines used in making cigars; and consists in the construction and arrangement of mechanism by which I am enabled to roll and shape the fillings and put on the wrappers in a perfect manner by mechanical means; the object of my invention being to form the cigar and apply the right and left hand wrappers without the need of any hand-labor or manipulation afterward of the cigar, as will be hereafter described.

The machine is composed, as shown in Figure 1 of the accompanying drawing, of a series of elastic or semi-elastic rollers, A A, four in number, having a cylindrical shape from one end and toward the center, for a portion of their length, and then increasing in diameter to the opposite end, so that the surface of the rollers shall have a concave shape for a portion of their length; and of a second series of rollers, B B, of smaller diameter than the first series, but of the same size throughout their length, except at the points that lie against the curved surface of the rollers A, this part of each roller being made of a convex form and tapering to a point. These two series of rollers are arranged within the frame of the machine, in two sets, the lower set, composed of three of the series A and two of the series B, held in bearings between the sides C C', and the upper set, formed of one of the series A and two of the series B, arranged between the sides c c of the frame, which are made to turn upon the hinges d d and shut down upon the stationary portion of the frame. When the upper part of the machine is turned down and closed, the concave rollers A A A A, that, from their office of rolling and giving shape to the cigar, I term the "positive" rollers, are held in position around a central axis, passing through the center of the cigar being rolled, one above, one below, and one upon each side, at equal distances apart, and the spaces between them are occupied by the feeding and guiding rollers B B B B. The space in the center between these eight rollers is of the shape of the cigar to be made, and from the form given to the rollers A and B, as described, it is cylindrical at one end and tapering at the other. Into this space the fillings are placed, and the wrappers are drawn and guided around them by the action of the rollers A B. The motion of these rollers is effected by the frictional surfaces $a\ b$ upon the ends of the roller-spindles that project beyond the frame C', and lie between it and the supplemental frame E E', supported by the rods $e\ e$, they being driven by the large roller F on the driving-shaft $f$, around which they are arranged, as shown in Fig. 1. The friction-rollers $a\ a$, that rotate the positive rollers A, are somewhat larger than the other rollers, $b\ b$, and consequently the guiding-rollers B B are driven faster than the others that shape the cigar. This difference in the speed of the two sets of rollers A B causes the rollers B, that run faster than the others, to perform the additional office of smoothing the wrappers as they are drawn in by the rollers, and guided and laid around the fillings. Thus the creases and inequalities in the wrappers are pressed out, and the leaf kept smooth without tearing it.

Fig. 2 shows a view of one of the concave-surface rollers A, with its friction-roller $a$ on the same spindle. These rollers are supported in a positive manner, at both ends, in the frame of the machine; but the other cylindrical rollers B are held only at one end, and their tapering points lie against and between the curved faces of the rollers A. Thus they have a slight yielding quality in addition to their elastic nature, which prevents any liability of the wrapper being drawn out too much, and torn or injured by the rapid motion of the rollers B as they will move slightly out of line away from the positive rollers if the resistance to their rotation is too great.

The frame of the machine has a feeding-table or surface, G, held between the sides C C', on a level with the face of the rollers A A in the lower set, to support the leaf forming the wrapper. Upon this surface the wrapper is spread out, and introduced and guided between the rollers by the operator tending the machine. The rotation of the driving-shaft $f$ may be effected by means of a crank, by hand-power, or it may be connected with mechanism in any suitable manner to run it by foot or steam-power.

The operation of my machine is as follows: The hinged top is raised and turned back, and a quantity of cut or scrap tobacco sufficient to form the "filling" of the cigar is introduced by hand or fed from a hopper above the machine into the space between the lower set of rollers, and the top turned down. Motion is then given to all the rollers to compress the fillings and determine the shape of the cigar, and when this is done it is ready to receive the first or right-hand wrapper. This is introduced by the attendant while the rollers are still revolving, the motion of the driving-shaft being forward or in the direction of the arrow, Fig. 1. When this wrapper is properly laid around the fillings the top of the machine is raised, and the edge of the second or left-hand wrapper is introduced at the back of the machine, between the half-formed cigar and the face of the upper roller A of the lower set—that is, nearest to the table—and after the machine is closed this second wrapper is laid around the cigar, in a contrary direction to the other, by a reverse motion of the machine. The cigar is then moved from the machine, and is ready to receive the tip and to be cut the proper length, according to the number of the cigar.

From this it will be seen that the machine operates to make a cigar without the need of employing a "binder" to hold the fillings in shape before the wrappers are put on, and, as these binders are composed of strips of poor and inferior quality of tobacco, that manufacturers use up in this manner, and work into their cigars without being readily detected, I am enabled to make a cigar without the necessity of working in an inferior kind of material, and thus I produce a better quality of cigar and make them all uniform in size and shape, which cannot be done by hand.

Having thus fully described my invention, and its mode of operation, what I claim therein as new, and desire to secure by Letters Patent, is—

1. In a cigar-machine, the combination of the rigid rollers A and the elastic rollers B, substantially as described and shown.

2. In a cigar-machine, the combination of the revolving rigid rollers A and the revolving elastic rollers B, placed in alternation around and at equal distances from a central line coinciding with the axis of the cigar, the said rollers B having a faster revolution than the rollers A, substantially as described and shown, for the purpose set forth.

3. In a cigar-machine, the combination of the rollers A B, placed in alternation around and at equal distances from a central line coinciding with the axis of the cigar, having their shanks $a$ $b$ of different diameters, and placed around a single driving-roller, F, substantially as described and shown.

CHARLES TALBOTCLARKE.

Witnesses:
EDWARD E. OSBORN,
WM. W. LEIGH.